United States Patent
Giroux et al.

(10) Patent No.: US 9,830,224 B2
(45) Date of Patent: Nov. 28, 2017

(54) SELECTIVE FAULT STALLING FOR A GPU MEMORY PIPELINE IN A UNIFIED VIRTUAL MEMORY SYSTEM

(71) Applicant: NVIDIA CORPORATION, Santa Clara, CA (US)

(72) Inventors: Olivier Giroux, San Jose, CA (US); Shirish Gadre, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 49 days.

(21) Appl. No.: 14/109,686

(22) Filed: Dec. 17, 2013

(65) Prior Publication Data

US 2014/0281679 A1    Sep. 18, 2014

Related U.S. Application Data

(60) Provisional application No. 61/800,004, filed on Mar. 15, 2013, provisional application No. 61/794,266, filed on Mar. 15, 2013.

(51) Int. Cl.
*G06F 11/00* (2006.01)
*G06F 11/14* (2006.01)

(52) U.S. Cl.
CPC ...... *G06F 11/141* (2013.01); *G06F 2201/815* (2013.01)

(58) Field of Classification Search
CPC .................. G06F 11/1076; G06F 11/1008
USPC ......................................................... 714/6.1
See application file for complete search history.

(56) References Cited

U.S. PATENT DOCUMENTS

| | | | | |
|---|---|---|---|---|
| 4,088,876 A | * | 5/1978 | Rege ................... | G06F 11/1008 365/77 |
| 5,150,469 A | * | 9/1992 | Jouppi ................ | G06F 9/30145 712/244 |
| 5,590,329 A | * | 12/1996 | Goodnow, II ...... | G06F 11/3624 714/E11.211 |
| 6,148,302 A | * | 11/2000 | Beylin ................. | G06F 9/4428 |
| 6,182,210 B1 | * | 1/2001 | Akkary ................ | G06F 9/3834 712/216 |
| 6,240,509 B1 | * | 5/2001 | Akkary ................ | G06F 9/3842 711/207 |
| 6,366,968 B1 | * | 4/2002 | Hunsaker .......................... | 710/52 |
| 6,385,715 B1 | * | 5/2002 | Merchant ............... | G06F 9/383 712/218 |

(Continued)

*Primary Examiner* — Amine Riad
(74) *Attorney, Agent, or Firm* — Artegis Law Group, LLP

(57) ABSTRACT

One embodiment of the present invention is a parallel processing unit (PPU) that includes one or more streaming multiprocessors (SMs) and implements a selective fault-stalling pipeline. Upon detecting a memory access fault associated with an operation executing on a particular SM, a replay unit in the selective fault-stalling pipeline considers the operation as a faulting operation. Subsequently, instead of notifying the SM of the memory access fault, the replay unit recirculates the operation—reinserting the operation into the selective fault-stalling pipeline. Recirculating faulting operations in such a fashion enables the SM to execute other operation while the replay unit stalls the faulting request until the associated access fault is resolved. Advantageously, the overall performance of the PPU is improved compared to conventional PPUs that, upon detecting a memory access fault, cancel the associated operation and subsequent operations.

19 Claims, 7 Drawing Sheets

(56) References Cited

U.S. PATENT DOCUMENTS

| | | | |
|---|---|---|---|
| 6,463,522 B1* | 10/2002 | Akkary | G06F 9/3834 712/216 |
| 6,851,074 B2* | 2/2005 | Miloiicic | G06F 11/073 711/159 |
| 7,219,349 B2* | 5/2007 | Merchant | G06F 9/383 712/218 |
| 7,373,548 B2* | 5/2008 | Reinhardt | G06F 11/1482 714/13 |
| 7,673,302 B1* | 3/2010 | Katzer | 718/101 |
| 8,015,388 B1* | 9/2011 | Rihan | G06F 12/1045 711/203 |
| 8,228,328 B1* | 7/2012 | French | G06T 15/40 345/421 |
| 8,266,383 B1* | 9/2012 | Minkin et al. | 711/125 |
| 8,612,720 B2* | 12/2013 | Sim | 711/206 |
| 8,694,714 B2* | 4/2014 | Kern et al. | 711/103 |
| 2002/0091914 A1* | 7/2002 | Merchant | G06F 9/383 712/219 |
| 2002/0092002 A1* | 7/2002 | Babaian | G06F 9/45504 717/137 |
| 2004/0172523 A1* | 9/2004 | Merchant | G06F 9/383 712/228 |
| 2006/0230258 A1* | 10/2006 | Di Gregorio | G06F 9/3851 712/228 |
| 2007/0091102 A1* | 4/2007 | Brothers et al. | 345/506 |
| 2009/0100200 A1* | 4/2009 | Bouvier | G06F 13/28 710/26 |
| 2009/0198893 A1* | 8/2009 | Sorgard | G06F 12/0862 711/118 |
| 2010/0321397 A1* | 12/2010 | Ginzburg | 345/531 |
| 2011/0161620 A1* | 6/2011 | Kaminski | G06F 12/1009 711/207 |
| 2011/0191539 A1* | 8/2011 | Hugosson et al. | 711/118 |
| 2012/0017063 A1* | 1/2012 | Hummel et al. | 711/200 |
| 2013/0145202 A1* | 6/2013 | Hartog | G06F 12/1081 714/2 |
| 2014/0075060 A1* | 3/2014 | Sharp et al. | 710/57 |
| 2014/0156949 A1* | 6/2014 | Chakrala et al. | 711/144 |
| 2014/0281263 A1* | 9/2014 | Deming et al. | 711/135 |
| 2014/0281299 A1* | 9/2014 | Duluk et al. | 711/160 |
| 2014/0281783 A1* | 9/2014 | Hodges et al. | 714/749 |
| 2016/0350159 A1* | 12/2016 | Mealey | G06F 9/5038 |
| 2016/0350234 A1* | 12/2016 | Podaima | G06F 12/1063 |

* cited by examiner

SELECTIVE FAULT STALLING FOR A GPU MEMORY PIPELINE IN A UNIFIED VIRTUAL MEMORY SYSTEM

CROSS-REFERENCE TO RELATED APPLICATIONS

This application claims benefit of the U.S. Provisional Patent Application having Ser. No. 61/800,004, filed on Mar. 15, 2013, which is hereby incorporated herein by reference. This application claims also benefit of the U.S. Provisional Patent Application having Ser. No. 61/794,266, filed on Mar. 15, 2013, which is hereby incorporated herein by reference.

BACKGROUND OF THE INVENTION

Field of the Invention

The present invention generally relates to computer science and, more specifically, to selective fault-stalling for a GPU memory pipeline in a unified virtual memory system.

Description of the Related Art

A typical computer system includes a central processing unit (CPU) and a parallel processing unit (PPU). Some PPUs are capable of very high performance using a relatively large number of small, parallel execution threads on dedicated programmable hardware processing units. The specialized design of such PPUs usually allows these PPUs to perform certain tasks, such as rendering 3-D scenes, much faster than a CPU. However, the specialized design of these PPUs also limits the types of tasks that the PPU can perform. By contrast, the CPU is typically a more general-purpose processing unit and therefore can perform most tasks. Consequently, the CPU usually executes the overall structure of a software application and then configures the PPU to implement tasks that are amenable to parallel processing.

As software applications execute on the computer system, the CPU and the PPU perform memory operations to store and retrieve data in physical memory locations. Some advanced computer systems implement a unified virtual memory architecture (UVM) common to both the CPU and the PPU. Among other things, the architecture enables the CPU and the PPU to access a physical memory location using a common (e.g., the same) virtual memory address, regardless of whether the physical memory location is within system memory or memory local to the PPU (PPU memory).

Computer systems typically include memory management functions to facilitate virtual memory and paging operations. During the course of normal operation, an instruction may request access to a virtual address associated with a page of data that is paged out, resulting in an access fault. In response to the access fault, conventional processing units may complete instructions preceding the faulting instruction, and cancel the faulting instruction along with all instructions that began execution subsequent to the faulting instruction. At this point, an access fault handler pages-in the requested page of data and re-starts execution beginning with the faulting instruction.

In operation, the access fault handler may require a significant amount of time to complete relative to typical instruction execution time. Notably, if the computer system implements a unified virtual memory architecture, then the access fault handler may perform lengthy faulting procedures that migrate memory pages between system and memory local to the PPU. Since CPUs are configured to generate a very limited number of outstanding memory access requests, access faults are relatively rare. Thus, in CPUs, this instruction-cancellation approach to access faults typically results in a relatively small average impact on overall computer system performance and may be acceptable.

By contrast, in a highly-parallel, multithreaded, advanced PPU, hundreds or many thousands of access requests may be outstanding at any moment and numerous memory access faults may be active at any moment. Therefore, if a PPU were to implement a conventional instruction-cancellation fault handing technique, the PPU would frequently cancel thousands of instructions over all execution units. Further, the PPU would wait for lengthy access fault handling procedures to load paged out data for each faulting instruction within each executing thread. Such waits would significantly, and often unacceptably, degrade overall computer system performance.

As the foregoing illustrates, what is needed in the art is a more effective approach to handling access faults in a unified virtual memory architecture.

SUMMARY OF THE INVENTION

One embodiment of the present invention sets for a computer-implemented method for processing operations in a multithreaded processing unit. The method includes identifying a first memory access request that is included in a first operation; executing the first memory access request; detecting a first fault associated with the first memory access request; and based on the first fault, recirculating the first operation for re-execution of the first memory access request.

One advantage of the disclosed approach is that a multithreaded processing unit continues to process operations in the presence of memory access faults. In particular, certain threads that did not contribute to any memory access faults make forward progress while the system is resolving memory access faults attributable to other threads. Consequently, the overall performance of the multithreaded processing unit is improved compared to conventional multithreaded processing units that, upon generating a memory access fault, cancel operations issued by all threads until the memory access fault is resolved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
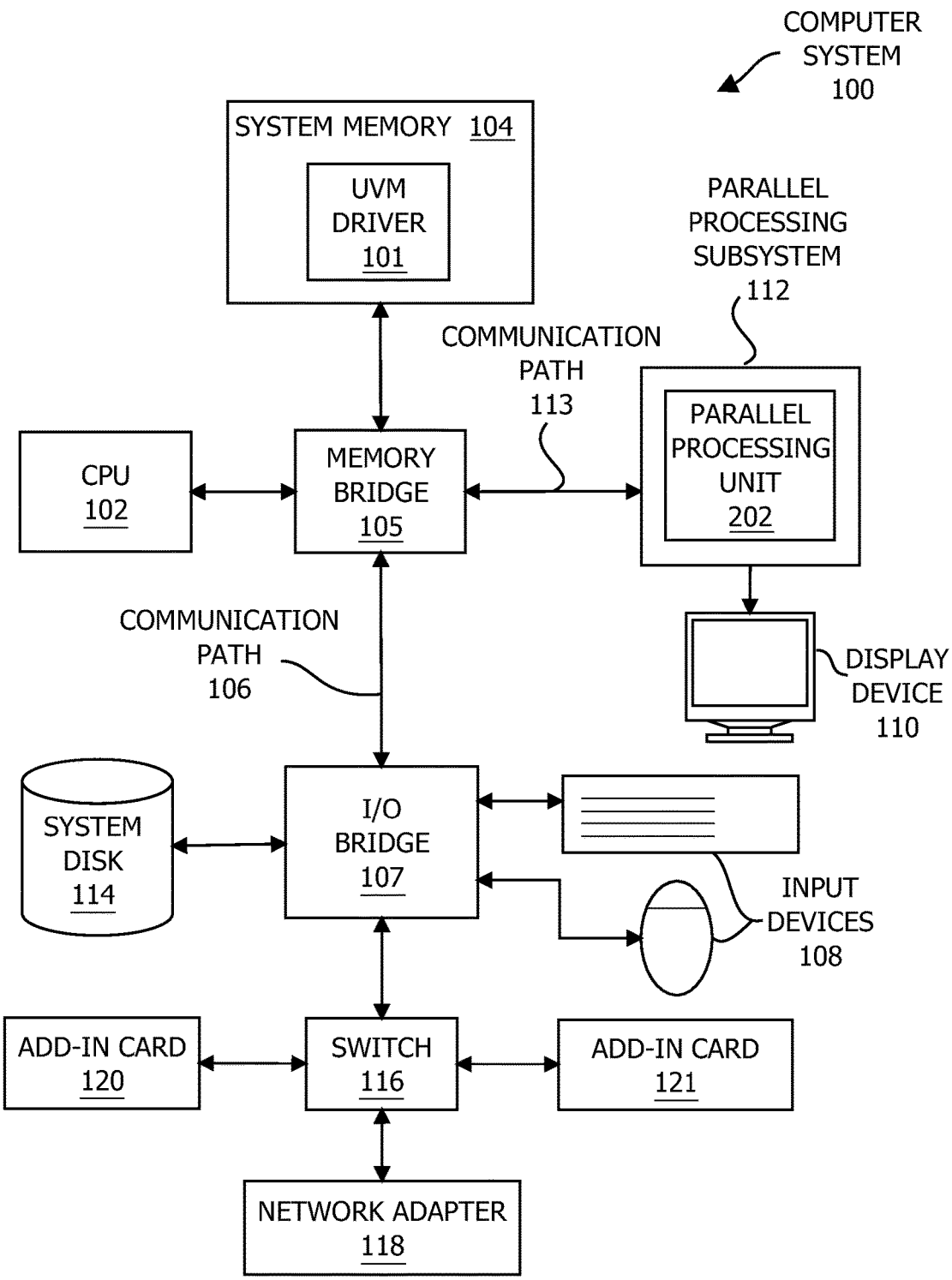
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
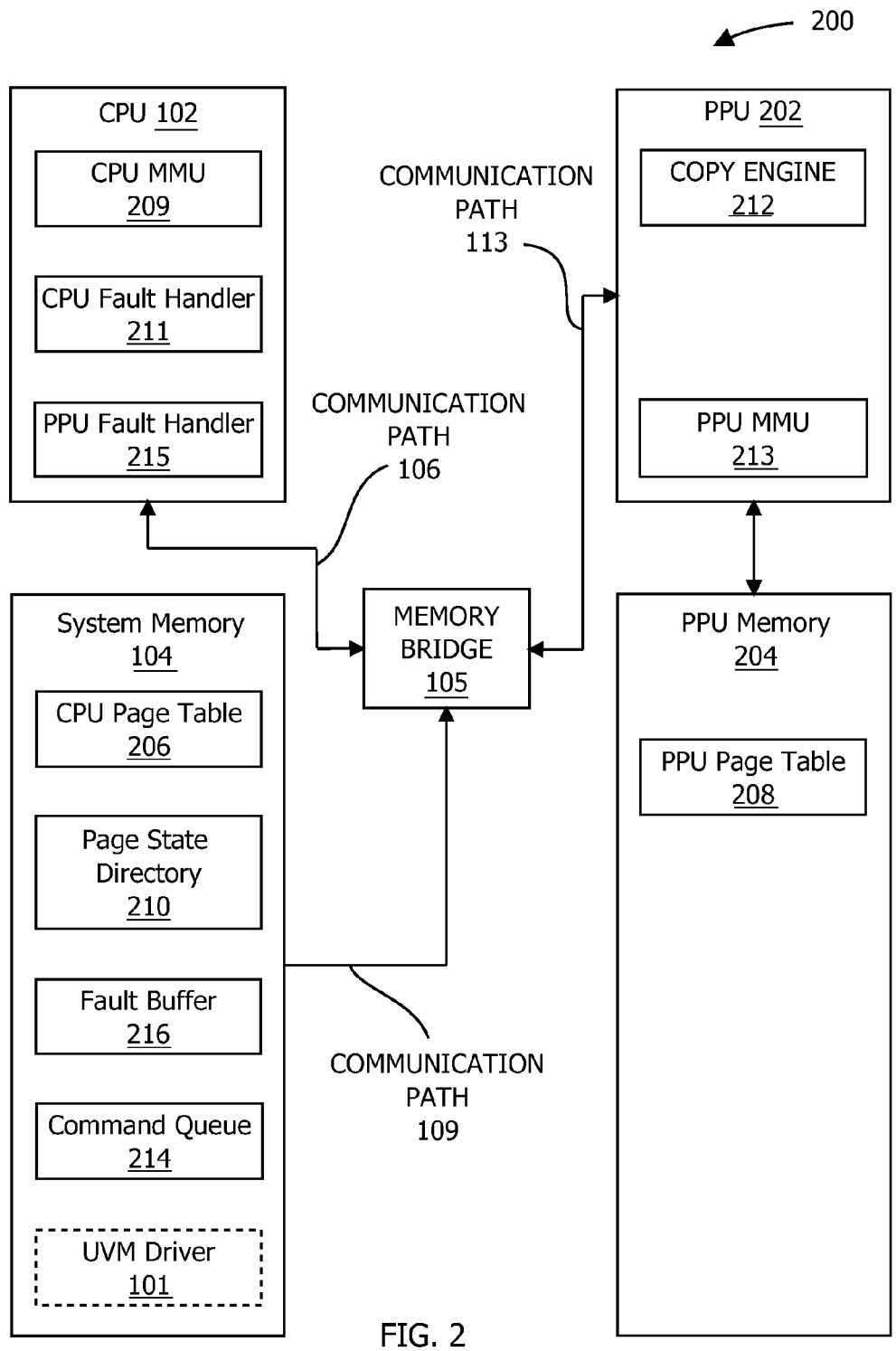
FIG. 2 is a block diagram illustrating a unified virtual memory system (UVM), according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:
(a) on the CPU 102 access to an unmapped page that is mapped to the PPU 202, that has not been recently migrated, unmap the faulting page from the PPU 202, migrate the page to the CPU 102, and map the page to the CPU 102;
(b) on the PPU 202 access to an unmapped page that is mapped to the CPU 102, that has not been recently migrated, unmap the faulting page from the CPU 102, migrate the page to the PPU 202, and map the page to the PPU 202;
(c) on the CPU 102 access to an unmapped page that is mapped to the PPU 202, that has been recently migrated, migrate the faulting page to the CPU 102 and map the page on both the CPU 102 and the PPU 202;
(d) on the PPU 102 access to an unmapped page that is mapped on the CPU 102, that has been recently migrated, map the page to both the CPU 102 and the PPU 202;
(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;
(f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;
(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.
(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and
(i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:
(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);
(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);
(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);
(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address.

After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 216.

Selective Fault-Stalling

As outlined previously herein, in the event of a faulting thread, a conventional PPU cancels the faulting operation along with all subsequently initiated operations until the page fault is remedied. To reduce the overall performance degradation associated with faulting threads, the PPU 202 implements selective fault-stalling techniques for an in-order pipeline, such as a memory pipeline, within a unified virtual memory architecture. Notably, these techniques enable certain threads to make forward progress—completing operations—while stalling other threads until associated page faults are resolved. In one embodiment, if a thread attempts to execute an operation that causes a page fault, then the thread group that includes the thread is stalled until the page fault is resolved. While the faulting thread group is stalled, other threads included in other thread groups continue to make forward progress.

Recirculating Operation Requests

Figure 3:
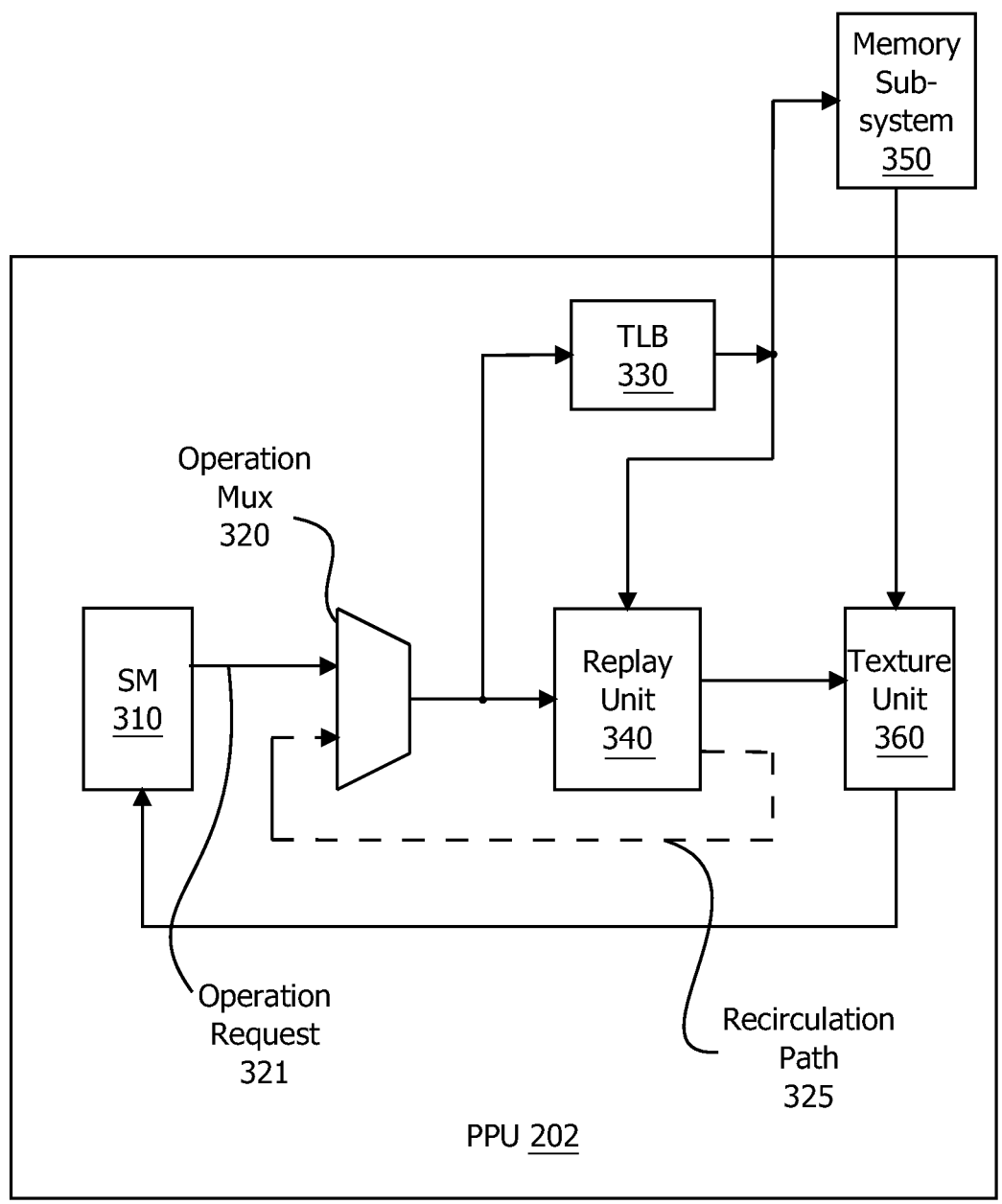
FIG. 3 is a conceptual diagram of the parallel processing unit of FIG. 2 in which a recirculation path is implemented, according to one embodiment of the present invention.

FIG. 3 is a conceptual diagram of the parallel processing unit (PPU) 202 of FIG. 2 in which a recirculation path 325 is implemented, according to one embodiment of the present invention. The recirculation path 325 enables the PPU 202 to stall selected operations requests 321 without delaying other operations requests 321. As shown, the PPU 202 includes, without limitation, one or more streaming multi-processors (SMs) 310, an operation mux 320, a translation lookaside buffer (TLB) 330, a replay unit 340, and a texture unit 360.

Among other things, the SM 310 issues operation requests 321 for execution by the texture unit 360. After the SM 310 issues a particular operation request 321, the operation request 321 passes through the operation mux 320 before reaching the TLB 330 and the replay unit 340. The TLB 330 performs one or more lookup operations to map virtual memory addresses associated with the operation request 321 to physical memory addresses in a memory subsystem 350. The memory subsystem 350 may include any cache coupled to the texture unit 360, such as a GPU level 2 cache. As persons skilled in the art will recognize, in the event of a cache-miss, such lookup operations may be time-consuming. Consequently, the replay unit 340 queues the operation requests 321 in a first-in-first-out order, thereby retaining the context of each operation request 321 with respect to the lookup operations of the TLB 330.

After the TLB 330 posts the translation results of the lookup operations associated with the operation request 321, the replay unit 340 routes the operation request 321 based on these translation results. In one embodiment, if the TLB 330 posts translation results that indicate a successful translation, then the replay unit 340 routes the operation request 321 to the texture unit 360. The texture unit 360 then executes the operation request 321—accessing the memory subsystem 350 based on the physical memory addresses included in the translation results posted by the TLB 330. Subsequently, the texture unit 360 returns the execution results to the SM 310. For example, if the operation request 321 were a virtual address translation request, then the texture unit 360 would return an acknowledgement and the physical memory address to the SM 310.

By contrast, if the translation results indicate an unsuccessful translation (i.e., a memory access fault), then the replay unit 340 marks the operation request 321 as "operation-faulted." The replay unit 340 then feeds-back the operation request 321 via the recirculation path 325 to the operation mux 320. Subsequently, the operation request 320 again passes through the operation mux 320 and is re-processed by both the TLB 330 and the replay unit 340. Eventually, the computer system 100 resolves the memory access fault, the TLB 330 posts successful translation results for the operation request 321, and the replay unit 340 routes the operation request 321 to the texture unit 360. In some situations, the faulting operation request 321 may recirculate multiple times before the memory access fault is resolved. Notably, the replay unit 340 ensures that the texture unit 360 does not receive the faulting operation request 321 until the TLB 330 posts successful translation results. Further, the SM 310 is unaware of the page fault initially associated with the operation request 321, does not cancel the faulting operation request 321, and continues to issue new operation requests 321.

In general, many operation requests 321 may be outstanding at any moment in the SM 310, and numerous memory access faults may be active at any moment. Consequently, there may be many different operation requests 321 recirculating via the recirculation path 325.

In another embodiment, upon determining that a particular operation request 321 is associated with a memory access fault, the replay unit 340 marks the warp associated with the faulting operation request 321 as "warp-faulted." This warp-faulted designation causes the replay unit 340 to consider all operation requests 321 from the warp to be faulted at the granularity of the warp. To preserve the integrity of the memory model, the replay unit 340 tracks the first faulting operation request 321 from each warp as the head of a sequence of one or more operation requests 321.

Upon receiving a subsequent operation request 321 from a thread included in a warp-faulted warp, the replay unit 340 marks the operation request 321 as a "chained-under-fault." Subsequently, the replay unit 340 recirculates the chained-under-fault operation request 321, in proper sequence, back to the replay unit 340 via the recirculation path 325. Until the memory access fault associated with the head of a sequence of warp-faulted operation requests 321 is resolved, the replay unit 340 continues to recirculate the warp-faulted operation requests 321. Thus, in operation, the replay unit 340 effectively stalls the warp-faulted operation requests 321.

After the memory access fault is resolved for the head of the sequence, the replay unit 340 removes the warp-faulted designation from the warp, and processes the previously-stalled operation requests 321 included in the warp in the proper sequence. As the replay unit 340 processes these operation requests 321, additional memory access faults may result. In such a scenario the replay unit 340 re-marks the warp as warp-faulted, sets the faulting operation request 321 as operation-faulted, and sets the head of the sequence of faults to specify the faulting operation request 321. In this fashion, the replay unit 340 maintains the proper sequence of operation requests 321 within each warp and, consequently, the integrity of the memory model.

In some embodiments, the replay unit 340 does not retry the memory access operations associated with "chained-under-fault" operation requests 321 until the warp associated with these operation requests 321 is no longer warp-faulted. In other embodiments, the replay unit 340 retries the memory access operations associated with each warp-faulted operation request 321 each time through the recirculation loop and then updates the operation-faulted status accordingly. In this fashion, the replay unit 340 causes the computer system 100 to attempt to pre-emptively resolve memory access faults associated with stalled operation requests 321, thereby reducing the time required to eventually process such operation requests 321.

In yet other embodiments, the replay unit 340 may determine whether to recirculate a particular operation request 321 based on faults at any granularity. For instance, in some embodiments, the replay unit 340 may recirculate operation requests 321 issued by any threads within a CTA that includes a thread that is associated with a faulting operation request 321.

In general, the techniques described herein are illustrative rather than restrictive, and may be modified to reflect various implementations without departing from the broader spirit and scope of the invention. For instance, the texture unit 360 is one of many units that may execute operation requests. Embodiments of the current invention may include any number and type of memory or execution units instead of or in conjunction with the texture unit 360. Further, the functionality included in the replay unit 340 may be implemented in any technically feasible fashion. In some embodiments, portions of the replay unit 340 may be implemented in the PPU MMU 213, dedicated hardware units, or software that executes on programmable hardware units. In yet other embodiments, the memory subsystem may reside outside the PPU 202.

Figure 4:
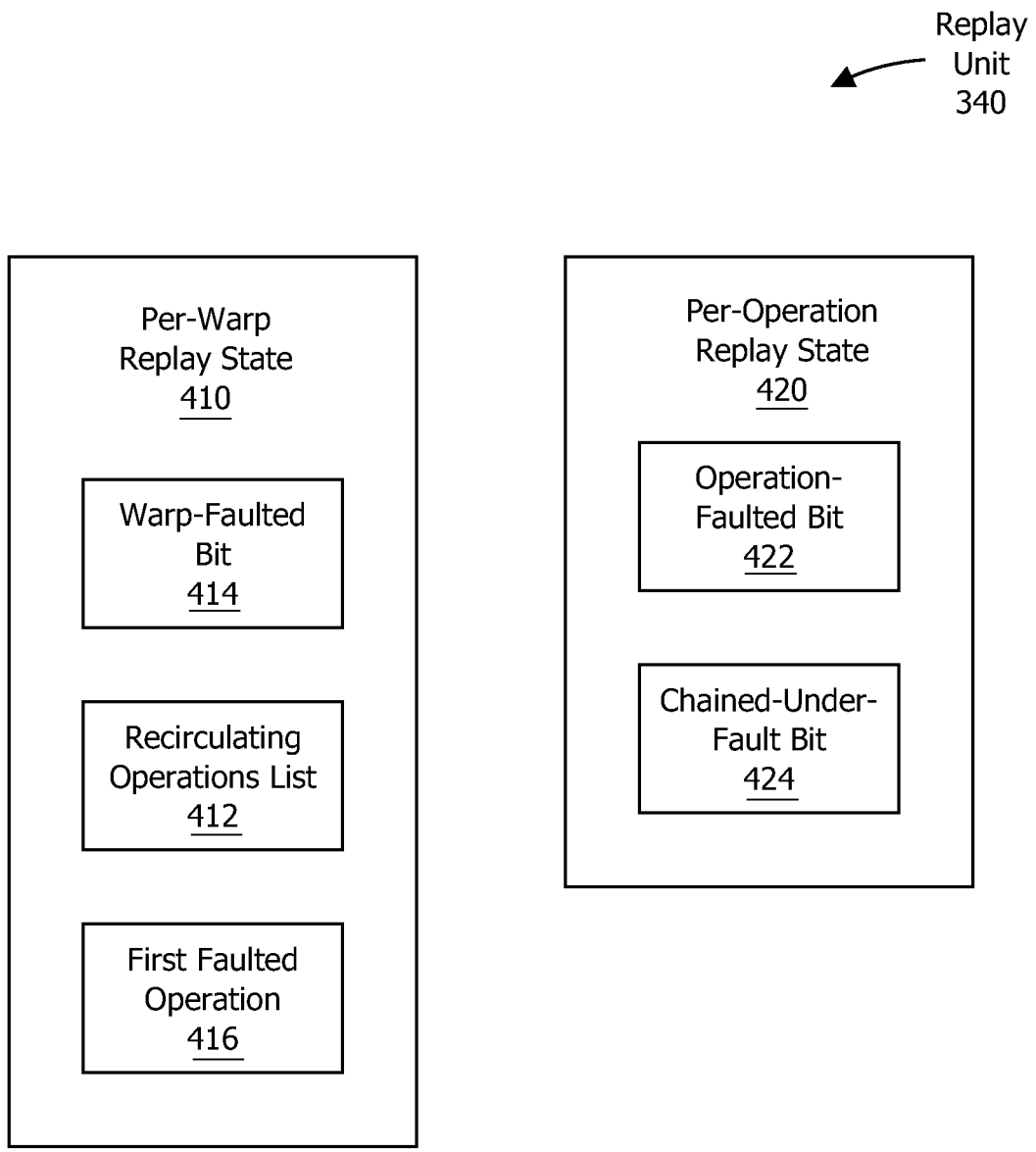
FIG. 4 is a conceptual diagram illustrating the replay unit of FIG. 3, according to one embodiment of the present invention.

FIG. 4 is a conceptual diagram illustrating the replay unit 340 of FIG. 3, according to one embodiment of the present invention. As shown, the replay unit 340 is configured to determine whether to "replay" operation requests 321 at the granularity of the warp and includes, without limitation, a per-warp replay state 410 and a per-operation replay state 420.

For each warp, the replay unit 340 maintains a different per-warp replay state 410. The per-warp replay state 410 includes a warp-faulted bit 414, a recirculating operations list 412, and a first faulted operation 416. The warp-faulted bit 414 indicates whether any thread within the warp has issued an operation request 321 that is associated with an unresolved memory access fault. The recirculating operations list 412 represents an in-order list of operations requests 321 issued by threads in the warp that are stalled pending the resolution of one or more memory access faults. For each operation request 321 in the recirculating operation list 412, the operation request 321 may be stalled based on either the operation request 321 itself or based on the first faulted operation 416. The first faulted operation 416 is the first operation request 321 within the warp that caused an unresolved memory access fault. If the warp-faulted bit 414 is set to an inactive value, then the first faulted operation 416 is irrelevant.

For each unfulfilled operation request 321, the replay unit 340 maintains a corresponding per-operation replay state 420. The per-operation replay state 420 includes an operation-faulted bit 422 and a chained-under-fault bit 424. The operation-faulted bit 422 indicates whether an attempt to translate a virtual address associated with the operation request 321 caused an as-yet unresolved memory access fault. The replay unit 340 associates each operation request 321 with the per-warp replay state 410 of the warp that includes the thread that issued the operation request 321. If the warp-faulted bit 414 in the corresponding per-warp replay state 410 is set to an active value, then the chained-under-fault bit 424 indicates that the operation request 321 is stalled pending the execution of the first faulted operation 416. If the warp-faulted bit 414 is set to an inactive value, then the chained-under-fault bit 424 is irrelevant.

In alternate embodiments the replay unit 340 may maintain data structures that facilitate any granularity of fault-tracking (e.g. CTA, thread, etc). For instance, in alternative implementations, the replay unit 340 may maintain thread active masks that enable fault-tracking at the per-thread level and a true thread-wise memory model. Further, the number and content of the data structures may vary. For instance, in some embodiments, the replay unit 340 does not include the warp-faulted bit 414. In such embodiments, the replay unit 340 may designate warps that are not associated with memory access faults by setting the first faulted operation 416 to a nil value.

Figure 5:
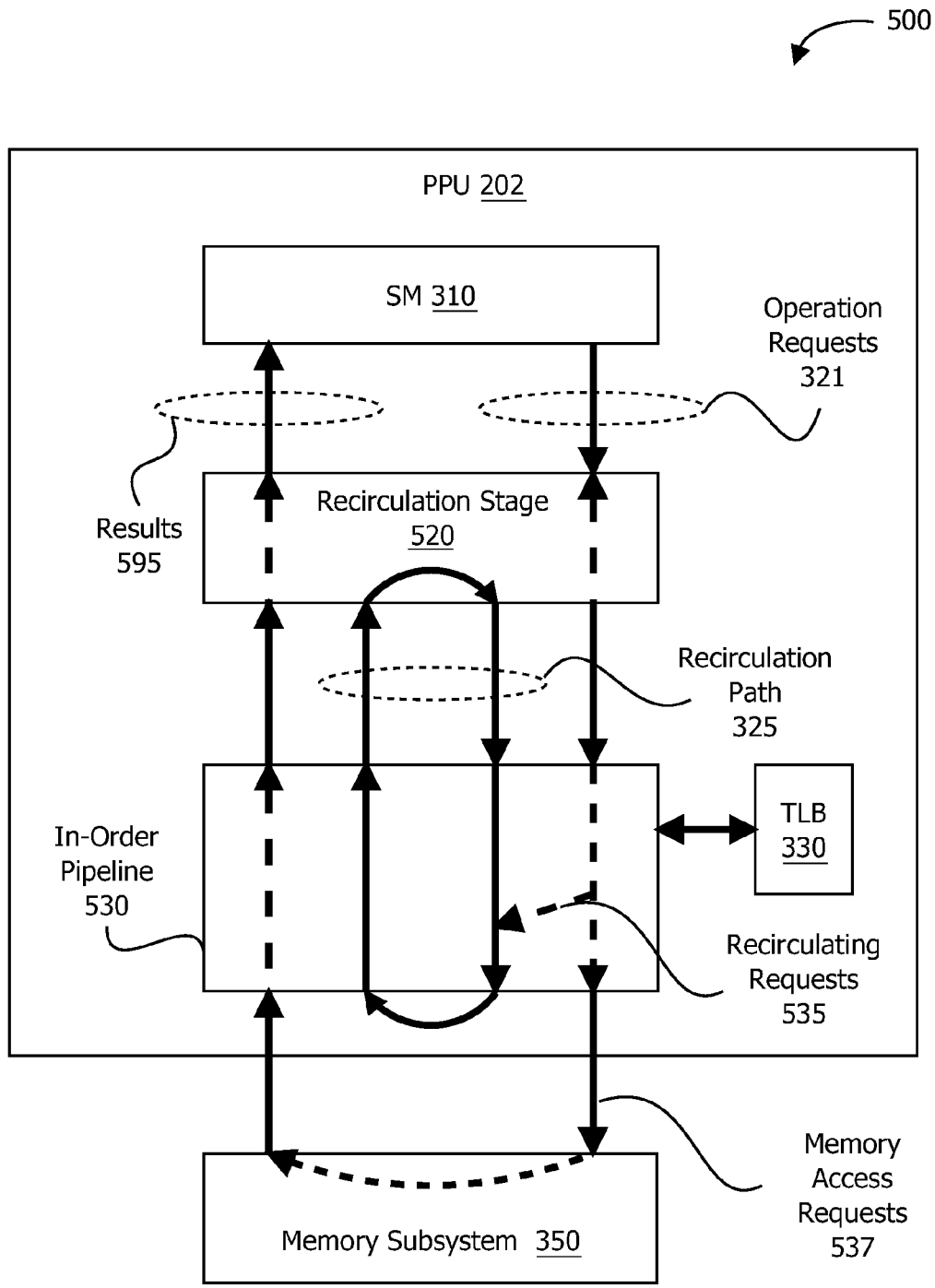
FIG. 5 is a conceptual diagram illustrating coexisting requests in a circulation stage and an in-order pipeline implemented in the parallel processing unit of FIG. 2, according to one embodiment of the present invention.

FIG. 5 is a conceptual diagram illustrating coexisting requests in a recirculation stage 520 and an in-order pipeline 530 implemented in the parallel processing unit (PPU) 202 of FIG. 2, according to one embodiment of the present invention. The requests may be targeted for execution by the texture unit 360 of FIG. 3 or any other execution unit or memory unit included in the PPU 202. Although not shown, the replay unit 340 of FIG. 3 facilitates the operation replay functionality manifested in the recirculation stage 520 and the in-order processing pipeline 530. In alternate embodiments replay functionality may be implemented in any technically feasible fashion. For example, the PPU MMU 213 of FIG. 2 may be configured to facilitate a portion of the replay functionality.

As shown, the SM 310 of FIG. 3 generates the operations requests 321 of FIG. 3, such as virtual memory access requests, that are transmitted to the in-order pipeline 530 via the recirculation stage 520. Upon receiving a particular operation request 321, the in-order pipeline 530 attempts to map the operation request 321 via the TLB 330. The operation request 321 becomes a pending request (not shown) within the in-order pipeline 530.

A pending request that is successfully mapped by the TLB 330 to a physical address within the memory subsystem 350 is passed to the memory subsystem 350 as a memory access request 537. By contrast, a pending request that is not successfully mapped in this way becomes a recirculating request 535. In such a scenario, the in-order pipeline 530 adds the recirculating request 535 to the recirculating operations list 412 of FIG. 4, thereby queuing the recirculating request 535 into the recirculation path 325. Subsequently, the recirculation stage 520 inserts the recirculating request 535 back into the in-order pipeline 530. Advantageously, the in-order pipeline 530 and the recirculation stage 520 replay the faulting operation request 321 without notifying the SM 310 of the page fault, and the SM 310 continues to issue operation requests 321.

In alternate embodiments, the SM 310 is notified of the page fault. In such embodiments, the notification may be a "hint"—suggesting that the SM 310 avoid issuing additional operation requests 321 at the tracked granularity regardless of whether the SM 310 is currently dependent on the memory data. Advantageously, in such embodiments, the SM 310 and the memory subsystem 350 may achieve higher performance by deprioritizing threads at the tracked granularity, thereby reducing the total number of recirculating requests 535.

While the recirculating requests 535 loop between the in-order pipeline 530 and the recirculation stage 520, the TLB 330 (in conjunction with other computer system 100 resources) attempts to create a valid mapping for at least one of the faulted operation requests 321. At some point during recirculation, a valid mapping becomes available within the TLB 330. When a memory access that is not associated with a chained-under-fault operation request 321 is successfully mapped by the TLB 330, that request becomes a memory access request 537. The memory subsystem 330 processes the memory access request 537, and results 595 are passed back the SM 310.

In some embodiments, the replay unit 340 tracks the threads at the granularity of the thread group. In such an embodiment, if any operation request 321 generates a fault, the operation request 312 and all subsequent operation requests 321 associated with the same thread group are marked for in-order circulation as recirculation requests 535. In this way, the operation requests 321 are converted into the results 595 in-order, and the operation requests 321 from different thread groups make forward progress, despite the pending access fault.

In some embodiments, the in-order pipeline 530 includes storage capable of holding partial results that are returned out-of-order by the memory subsystem 350. In such embodiments, the replay unit 340 may be implemented using the existing in-order pipeline 530. Advantageously, in such embodiments, the recirculating operations list 412 may be finely-interleaved with the active operations list to facilitate space compression.

Figure 6A:
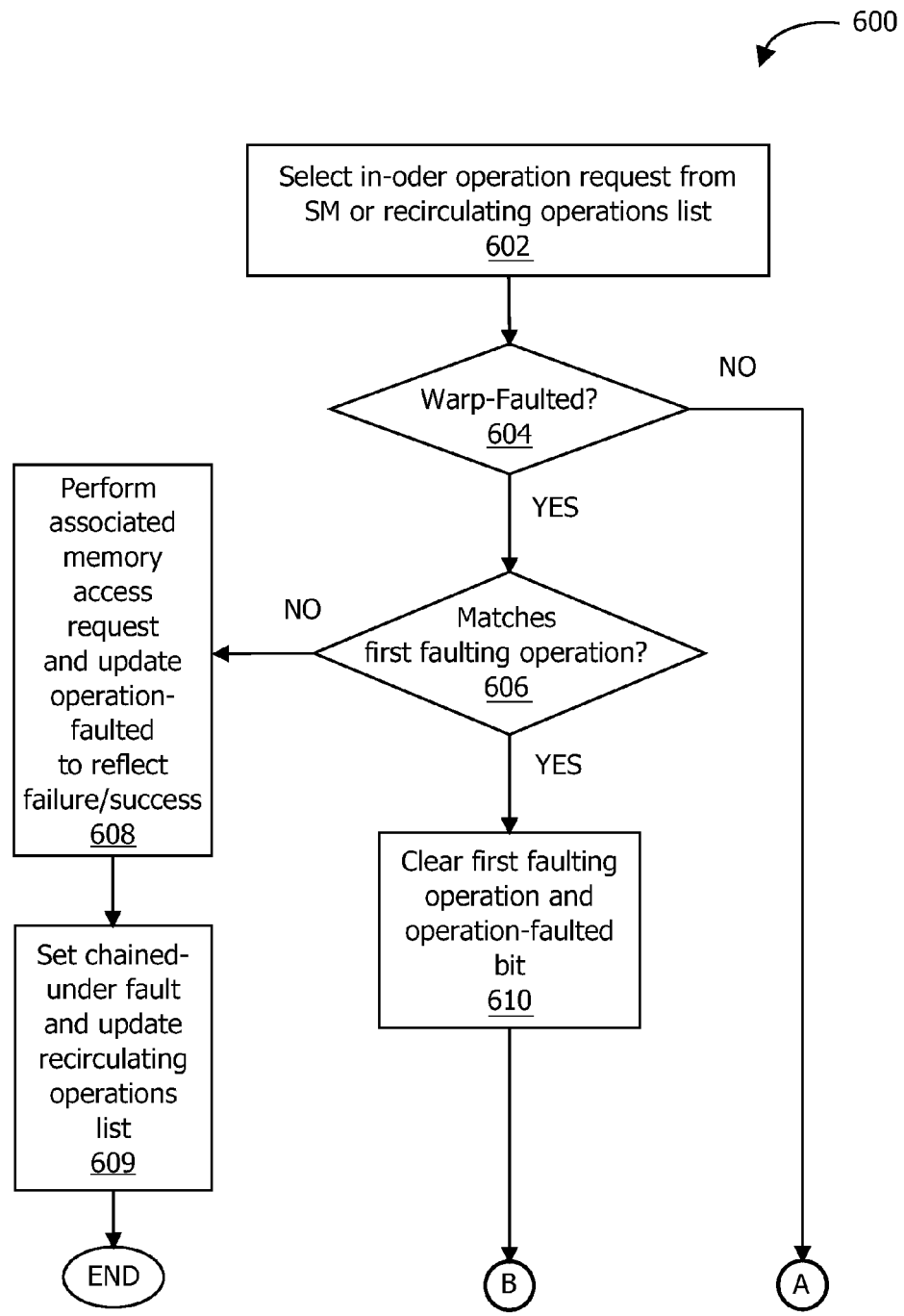
FIGS. 6A-6B set forth a flow diagram of method steps for enabling certain threads to continue executing on a streaming multiprocessor (SM), while the computer system resolves faulting memory accesses associated with other threads, according to one embodiment of the present invention.
Figure 6B:
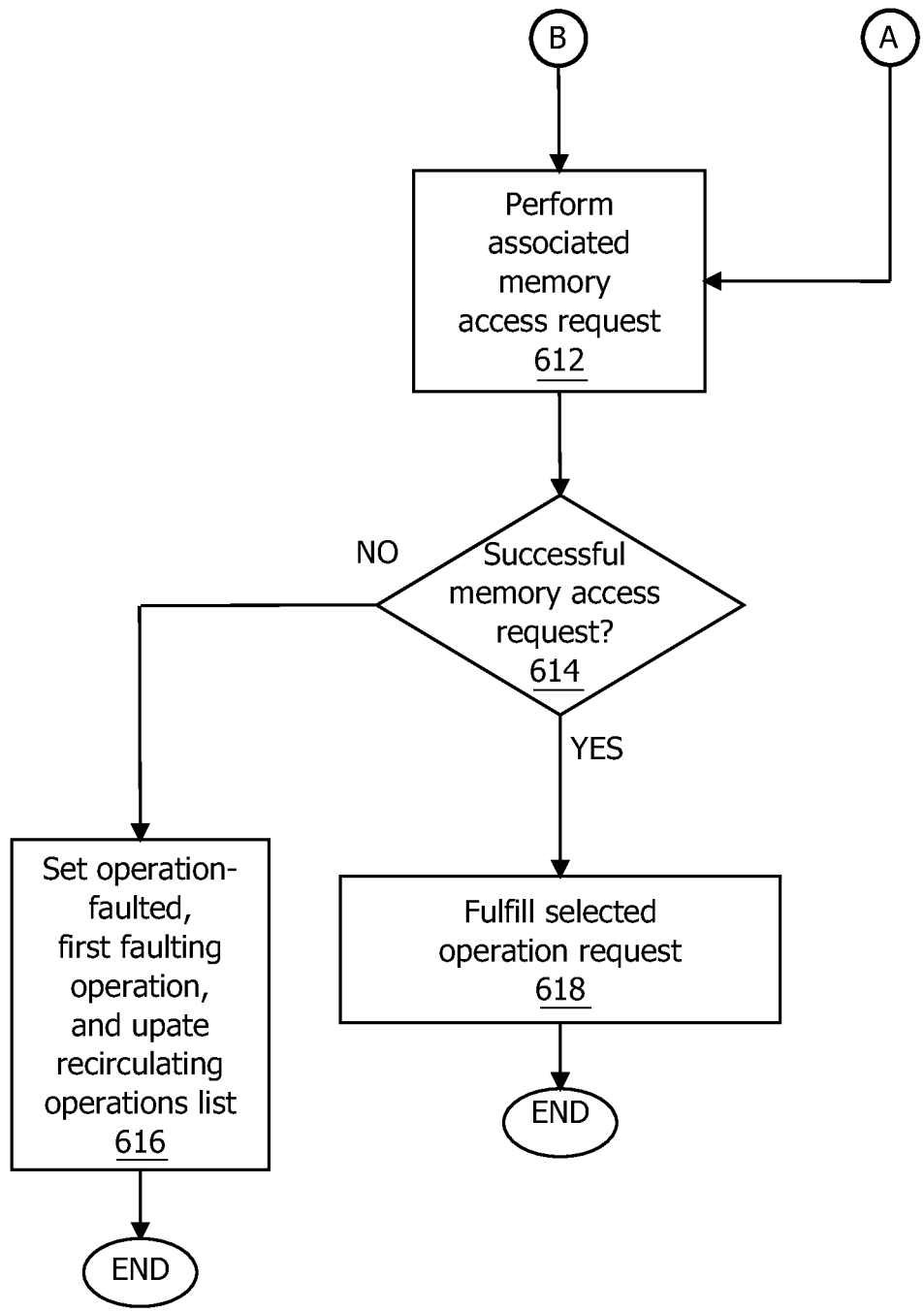

FIGS. 6A-6B set forth a flow diagram of method steps for enabling certain threads to continue executing on a streaming multiprocessor (SM), while the computer system resolves faulting memory accesses associated with other threads, according to one embodiment of the present invention. Although the method steps are described herein in conjunction with the systems of FIGS. 1-5, persons skilled in the art will understand that any system configured to implement the method steps, in any order, falls within the scope of the present invention.

As shown, a method 600 begins at step 602, where the replay unit 340 selects a particular operation request 321 for processing within the in-order pipeline 530. The replay unit 340 may select the operation request 321 in any technically feasible fashion that is consistent with the memory model. In particular, the replay unit 340 selects either an operation request 321 from the recirculating operations list 412 or an operation request 321 issued directly by the SM 310. As part of step 602, the replay unit 340 identifies the warp that includes the thread that issued the selected operation request 321. The replay unit 340 then determines whether the warp is warp-faulted based on the warp-faulted bit 414. At step 604, if the replay unit 340 determines that the selected operation request 321 is not associated with a warp-faulted warp, then the method 600 proceeds to step 612.

If, at step 604, the replay unit 340 determines that the selected operation request 321 is associated with a warp-faulted warp, then the method 600 proceeds to step 606. At step 606 the replay unit 340 performs comparison operations between the selected operation request 321 and the first faulted operation 416. If, at step 606, if the replay unit 340 determines that the selected operation request 321 does not match the first faulted operation 416, then the method 600 proceeds to step 608. At step 608, the TLB 330 performs a memory access request associated with the selected operation request 312. If the memory access request was successful, then the replay unit 340 sets the operation-faulted bit 422 to an inactive value. By contrast, if the memory access request causes an access fault, then the replay unit 340 sets the operation-faulted bit 422 to an active value.

At step 609, the replay unit 340 sets the chained-under-fault bit 424 to an active value and appends the operation request 321 to the recirculating operations list 412. If the operation request 321 is already included in the recirculating operations list 412, then the replay unit 340 updates neither the chained-under-fault bit 424 nor the recirculating operations list 412. As part of step 609, the replay unit 340 ensures that the operation request 321 recirculates and ceases this particular attempt to fulfill the operation request 321. The method 600 then terminates.

At step 606, if the replay unit 340 determines that the selected operation request 321 matches the first faulted operation 416, then the replay unit 340 associates the selected operation request 321 with a non-faulted state. In particular, the replay unit 340 sets the first faulting operation 416 to a null value, sets the operation-faulted bit 422 to an inactive value, and removes the operation request 312 from the recirculating operations list 412.

At step 612, the TLB 330 performs a memory access request associated with the selected operation request 321. If, at step 614, the memory replay unit 340 determines that the memory access request was unsuccessful, then the method 600 proceeds to step 616. At step 616, the memory replay unit 340 sets the operation-faulted bit 422 to an active value and sets the first faulting operation 416 to correspond to the selected operation request 321. Further, the replay unit 340 appends the selected operation request 321 to the recirculating operations list 412, thereby ensuring in-order replay of the stalled operation request 321.

At step 614, if the replay unit 640 determines that the memory access request was successful, then the method 600 proceeds to step 618. At step 618, the replay unit 640 causes a different unit in the PPU 202, such as the texture unit 360, to fulfill the selected operation request 312, and the method 600 terminates.

In sum, a parallel processing unit (PPU) implements fault-handling techniques that enable certain threads to continue executing on a streaming multiprocessor (SM), while the computer system resolves faulting memory accesses associated with other threads. In operation, a replay unit tracks and stalls operation requests that are associated with memory access faults. Notably, the replay unit allows operation requests issued by threads included in thread groups that are not associated with memory access faults to execute to completion. By contrast, the replay unit stalls operation requests issued by threads included in thread groups that are associated with a memory access fault—recirculating these operation requests until the memory access fault is resolved. After the memory access fault is resolved, the replay unit causes the stalled operation requests to finish executing.

Advantageously, allowing forward progress of selected threads while stalling other threads enables the SM to both continue executing operation requests and preserve the integrity of the memory model in the presence of memory access faults. By contrast, upon generating a memory access fault, an SM included in a conventional PPU cancels the operation request associated with the memory access fault along with all of the operation requests that began execution subsequent to the faulting operation. Such an SM does not resume executing operation requests until the memory access fault is resolved. Consequently, the performance degradation associated with memory access faults in PPUs that implement selective fault-stalling is reduced compared to conventional PPUs.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for processing operations in a multithreaded processing unit, the method comprising:
   identifying a first memory access request that is included in a first operation issued by a first thread included in a first group of threads;
   executing the first memory access request via a first execution path;
   detecting a first fault associated with the first memory access request;
   in response detecting the first fault, setting a first fault bit corresponding to the first group of threads to an active value;
   based on the active value of the first fault bit, queueing the first operation in a second path that recirculates the first operation back to the first execution path for re-execution of the first memory access request;
   identifying a second memory access request that is included in a second operation that has been issued by a second thread included in the first group of threads; and
   based on the active value of the first fault bit, queueing the second memory access request for re-execution.

2. The method of claim 1, further comprising:
   re-executing the first memory access request;
   detecting that the first fault has been resolved; and
   causing the first operation to execute.

3. The method of claim 1, further comprising:
   re-executing the first memory access request;
   detecting that the first fault has been resolved;
   setting the first fault bit to an inactive value;
   causing the first operation to complete;
   re-executing the second memory access request;
   determining that the second memory access request has been successfully serviced; and
   causing the second operation to execute.

4. The method of claim 1, wherein the first group of threads is part of a cooperative thread array.

5. The method of claim 1, wherein the method further comprises:
   identifying a third operation that is issued by a third thread;
   determining that the third thread is included in a second group of threads;
   determining that the value of a second fault bit corresponding to the second group of threads equals an inactive value;
   based on the inactive value of the second fault bit and the active value of the first fault bit, causing the second operation to execute prior to re-executing the first memory access request.

6. The method of claim 1, further comprising performing one or more write operations that set the first fault bit to an active value.

7. The method of claim 1, wherein the method further comprises performing one or more write operations that set a faulting operation field corresponding to the first group of threads to a value that identifies the first operation.

8. The method of claim 1, wherein the first fault comprises an accidental condition that causes the multithreaded processing unit to fail to perform the first operation.

9. The method of claim 1, wherein queueing the first operation is further based on a granularity of fault tracking associated with the first fault.

10. The computer-implemented method of claim 1, further comprising:
    executing a second memory access request that is included in the first operation via the first execution path; and
    subsequent to executing the second memory request, re-executing the first memory access request via the first execution path.

11. A computer-readable storage medium including instructions that, when executed by a multithreaded processing unit, cause the multithreaded processing unit to process operations by performing the steps of:
    identifying a first memory access request that is included in a first operation issued by a first thread included in a first group of threads;
    executing the first memory access request via a first execution path;
    detecting a first fault associated with the first memory access request;
    in response detecting the first fault, setting a first fault bit corresponding to the first group of threads to an active value;
    based on the active value of the first fault bit, queueing the first operation in a second path that recirculates the first operation back to the first execution path for re-execution of the first memory access request;
    identifying a second memory access request that is included in a second operation that has been issued by a second thread included in the first group of threads; and based on the active value of the first fault bit, queueing the second memory access request for re-execution.

12. The computer-readable storage medium of claim 11, further comprising:
re-executing the first memory access request;
detecting that the first fault has been resolved; and
causing the first operation to execute.

13. The computer-readable storage medium of claim 11, further comprising:
re-executing the first memory access request;
detecting that the first fault has been resolved;
setting the first fault bit to an inactive value;
causing the first operation to complete;
re-executing the second memory access request;
determining that the second memory access request has been successfully serviced; and
causing the second operation to execute.

14. The computer-readable storage medium of claim 11, wherein the first group of threads is part of a cooperative thread array.

15. The computer-readable storage medium of claim 11, wherein the method further comprises:
identifying a third operation that is issued by a third thread;
determining that the third thread is included in a second group of threads;
determining that the value of a second fault bit corresponding to the second group of threads equals an inactive value;
based on the inactive value of the second fault bit and the active value of the first fault bit, causing the second operation to execute prior to re-executing the first memory access request.

16. The computer-readable storage medium of claim 11, further comprising performing one or more write operations that set the first fault bit to an active value.

17. The computer-readable storage medium of claim 11, wherein the method further comprises performing one or more write operations that set a faulting operation field corresponding to the first group of threads to a value that identifies the first operation.

18. A system configured to process operations, the system comprising:
a memory;
a multithreaded processing unit coupled to the memory and configured to:
identify a first memory access request that is included in a first operation issued by a first thread included in a first group of threads;
execute the first memory access request via a first execution path;
detect a first fault associated with the first memory access request;
in response to detecting the first fault, set a first fault bit corresponding to the first group of threads to an active value;
based on the active value of the first fault bit, queue the first operation in a second path that recirculates the first operation back to the first execution path for re-execution of the first memory access request;
identify a second memory access request that is included in a second operation that has been issued by a second thread included in the first group of threads; and
based on the active value of the first fault bit, queue the second memory access request for re-execution.

19. The system of claim 18, wherein the multithreaded processing unit is further configured to re-execute the first memory access request on the memory, detect that the first fault has been resolved, and cause the first operation to execute.

* * * * *